US012808545B2

(12) United States Patent
Baldwin

(10) Patent No.: US 12,808,545 B2
(45) Date of Patent: Nov. 24, 2026

(54) METHOD OF OPERATING A COOKING DEVICE

(71) Applicant: Breville Pty Limited, Alexandria (AU)

(72) Inventor: Douglas Eugene Baldwin, Alexandria (AU)

(73) Assignee: BREVILLE PTY LIMITED, Alexandria (AU)

(*) Notice: Subject to any disclaimer, the term of this patent is extended or adjusted under 35 U.S.C. 154(b) by 191 days.

(21) Appl. No.: 18/861,351

(22) PCT Filed: May 4, 2023

(86) PCT No.: PCT/AU2023/050372

§ 371 (c)(1),
(2) Date: Oct. 29, 2024

(87) PCT Pub. No.: WO2023/212778

PCT Pub. Date: Nov. 9, 2023

(65) Prior Publication Data

US 2025/0290638 A1 Sep. 18, 2025

(30) Foreign Application Priority Data

May 4, 2022 (AU) ................................ 2022901181

(51) Int. Cl.
*F24C 7/08* (2006.01)
*A47J 36/32* (2006.01)
*A47J 37/06* (2006.01)

(52) U.S. Cl.
CPC ............... *F24C 7/085* (2013.01); *A47J 36/32* (2013.01); *A47J 37/0629* (2013.01); *A47J 2202/00* (2013.01)

(58) Field of Classification Search
CPC . F24C 7/085; F24C 15/00; A47J 36/32; A47J 37/0629; A47J 2202/00; A47J 37/06;
(Continued)

(56) References Cited

U.S. PATENT DOCUMENTS 6,299,921 B1 10/2001 Loeffler et al.
11,448,403 B2 * 9/2022 Abdoo ................ F27D 21/0014
(Continued)

FOREIGN PATENT DOCUMENTS

AU 2012203403 A1 * 1/2013 ............ F24C 15/327
EP 2063183 A2 5/2009
(Continued)

OTHER PUBLICATIONS

Translation of JP 4571600B2 (Year: 2010).*
(Continued)

*Primary Examiner* — Drew E Becker
(74) *Attorney, Agent, or Firm* — KDW FIRM PLLC

(57) ABSTRACT

A cooking device 1100 and a method 200 of cooking a food article using the cooking device 1100. In one aspect, the cooking device 1100 comprises a cooking chamber, a heating component 160 and a controller 105 having a processor 110, wherein the processor 110 of the controller 105 is configured to: control the heating component 105 to heat the cooking chamber of the cooking device 1100; measure a time taken for an internal temperature of the food article to change from a first temperature to a second temperature; calculate at least one physical attribute of the food article based on the measured time and at least one thermophysical property of the food article; calculate an estimated cooking completion time based on the calculated physical attribute of the food article; and control the heating component 160 to cook the food article based on the estimated cooking completion time.

20 Claims, 14 Drawing Sheets

(58) Field of Classification Search
CPC ........... A23L 5/10; A23L 5/17; H05B 1/0263; H05B 1/0202
See application file for complete search history.

(56) References Cited

U.S. PATENT DOCUMENTS

| | | | | |
|---|---|---|---|---|
| 2007/0288192 | A1 | 12/2007 | Imgram et al. | |
| 2013/0092680 | A1 * | 4/2013 | Cartwright | H05B 6/687 219/622 |
| 2014/0242227 | A1 | 8/2014 | Yang et al. | |
| 2016/0353921 | A1 * | 12/2016 | Dodge | A47J 36/321 |
| 2017/0016623 | A1 * | 1/2017 | Rabie | F24C 15/327 |
| 2019/0086097 | A1 * | 3/2019 | Morandotti | F24C 1/00 |
| 2019/0250043 | A1 * | 8/2019 | Wu | G01K 3/005 |
| 2019/0285483 | A1 * | 9/2019 | Cheng | F24C 7/085 |
| 2020/0069103 | A1 * | 3/2020 | Baldwin | A47J 27/10 |
| 2020/0187509 | A1 * | 6/2020 | Murphy | A21B 1/40 |
| 2021/0145212 | A1 * | 5/2021 | Wang | A23L 5/10 |
| 2022/0117274 | A1 * | 4/2022 | Bhogal | A47J 36/32 |
| 2023/0189851 | A1 * | 6/2023 | Briggeman | A23L 5/10 702/130 |
| 2024/0385055 | A1 * | 11/2024 | Simpson | G01K 3/10 |

FOREIGN PATENT DOCUMENTS

| | | | |
|---|---|---|---|
| JP | H06304077 | A | 11/1994 |
| JP | 2002238777 | A | 8/2002 |
| WO | 2009026887 | A2 | 3/2009 |

OTHER PUBLICATIONS

The International Search Report and Written Opinion mailed Aug. 9, 2023 for corresponding PCT/AU2023/050372 (12 pages).
Extended European Search Report for EP Application No. 23799046.0, dated Mar. 6, 2026, 8 pages.

* cited by examiner

METHOD OF OPERATING A COOKING DEVICE

CROSS-REFERENCE TO RELATED APPLICATIONS

This application is a national phase application claiming priority to International Patent Application No. PCT/AU2023/050372, entitled "Method Of Operating A Cooking Device" and filed May 4, 2023, which claims priority to Australian Provisional Patent Application No. 2022901181, filed May 4, 2022, the contents of which are incorporated by reference herein in their entireties.

FIELD

The present invention relates to a method of cooking a food article in a cooking device, and a cooking device for cooking a food article.

BACKGROUND

Certain thermometers provide an early warning when a food article is near a target temperature. For example, certain ovens are configured to change cooking mode (e.g., from roast mode to keep-warm mode) once a specific temperature is reached. However, configuring the cooking device to merely react to an internal temperature may not necessarily obtain a desired result for the user. For example, a roast may reach a desired internal temperature within an oven after 1 hour or 2 hours depending upon the cooking process. The cooked food article will be extremely different in each cooking scenario. Due to these complexities of cooking, it can be difficult for an inexperienced user to know how long and potentially the steps involved to cook a food article to achieve a desired cooking outcome. For example, a user may want to cook a pork leg with crispy crackling. Whilst it may be possible to cook the pork leg to have a desired internal temperature to ensure the food article is cooked, it will be more difficult for the user to know how to cook the food article to achieve the desired crackling, particularly since each pork leg cooked by the user, if any, will be slightly different each time. For example, the water content may slightly vary from one food article to the next, thus making it difficult to apply general cooking instructions.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

It is an object of the present invention to at least substantially alleviate one or more of the above disadvantages, or at least provide a useful alternative.

In a first aspect there is provided a method of cooking a food article in a cooking device, the cooking device including a cooking chamber and at least one heating component, wherein the method is performed by one or processors comprising steps of: heating the cooking chamber of the cooking device; measuring a time taken for an internal temperature of the food article to change from a first temperature to a second temperature, wherein the internal temperature is measured by one or more temperature probes being part of or associated with the cooking device; calculating at least one physical attribute of the food article based on the measured time and at least one thermophysical property of the food article; calculating an estimated cooking completion time based on the calculated physical attribute of the food article; and controlling the at least one heating component to cook the food article based on the estimated cooking completion time.

In certain embodiments of the first aspect, the method further comprises receiving at least one user input indicative of the food article.

In certain embodiments of the first aspect, at least one user input indicative of the food article comprises a characteristic of the food including at least one of a food type, a weight of the food, a recipe, and a type of preparation for the food article.

In certain embodiments of the first aspect, the method further comprises calculating or receiving the at least one thermophysical property of the food article based on the received user input.

In certain embodiments of the first aspect, the at least one thermophysical property of the food article comprises a thermal diffusivity of the food article.

In certain embodiments of the first aspect, the at least one physical attribute of the food article is a length of the food article.

In certain embodiments of the first aspect, the length of the food article is calculated, by the one or more processors, according to:

$$L \propto \sqrt{\alpha t^*}$$

wherein:

L is the length of the food article;

$\alpha$ is the thermal diffusivity of the food article; and t * is a time taken for the internal temperature of the food article to change from the first temperature to the second temperature.

In certain embodiments of the first aspect, the method further comprises receiving an indication of when the food article is placed in the cooking chamber.

In certain embodiments of the first aspect, the method further comprises updating a cooking program being applied by the one or more processors to control the at least one heating component, wherein updating the cooking program is based on the estimated cooking completion time.

In certain embodiments of the first aspect, the method comprises: determining an estimated start time of a browning state of the food article based on a surface adjacent temperature and the cooking chamber temperature.

In certain embodiments of the first aspect, the determining the estimated start time of the browning state of the food article comprises determining when the surface adjacent temperature of the food article approaches the cooking chamber temperature.

In certain embodiments of the first aspect, the surface adjacent temperature of the food article is determined to approach the cooking chamber temperature when surface adjacent temperature is within a threshold range of the cooking chamber temperature.

In certain embodiments of the first aspect, the method further comprises: determining an estimated start time of a browning state of the food article based on a plurality of temporally spaced measurements indicative of the power drawn by the at least one heating component; and controlling the at least one heating component of the cooking device based on the estimated start time of the browning state.

In certain embodiments of the first aspect, the method further comprises: receiving a user input indicative of a target outcome shade of browning of the food article.

In certain embodiments of the first aspect, the method further comprises: receiving a user input indicative of a target outcome shade of browning of the food article; and controlling the at least one heating component of the cooking device based on a comparison of the target outcome shade of browning to the estimated outcome shade of browning.

In certain embodiments of the first aspect, the method further comprises revising a cooking program based on based on at least one of a determined estimated cooking time and the estimated start time of a browning state, and controlling the at least one heating component according to the revised cooking program.

In certain embodiments of the first aspect, the at least one heating component is controlled to increase the temperature of the cooking chamber in response to the estimated outcome shade of browning being lighter than the target shade of browning of the food article.

In certain embodiments of the first aspect, the method further comprises determining a revised estimated cooking completion time based on the temperature of the cooking chamber being increased, wherein the revised estimated cooking completion time is less than the initial estimated cooking completion time.

In certain embodiments of the first aspect, the at least one heating component is controlled to reduce the temperature of the cooking chamber in response to the estimated outcome shade of browning being darker than the target shade of browning of the food article.

In certain embodiments of the first aspect, the method further comprises determining a revised estimated cooking completion time based on the temperature of the cooking chamber being reduced, wherein the revised estimated cooking completion time is greater than the initial estimated cooking completion time.

In a second aspect there is provided a method of cooking a food article in a cooking device, wherein the method is performed by one or more processors and comprises steps of: heating a cooking chamber of the cooking device for cooking the food article; determining a temperature corresponding to a surface adjacent temperature of the food article; determining a cooking chamber temperature within the cooking chamber of the cooking device; determining, during cooking of the food article and based on the surface adjacent temperature and the cooking chamber temperature, an estimated start time of a browning state of the food article; and controlling at least one heating component of the cooking device based on the estimated start time of the browning state.

In certain embodiments of the second aspect, the determining the estimated start time of the browning state of the food article comprises determining when the surface adjacent temperature of the food article is approaching the cooking chamber temperature and within a threshold range of the cooking chamber temperature.

In certain embodiments of the second aspect, the surface adjacent temperature of the food article is determined to approach the cooking chamber temperature when surface adjacent temperature and within a threshold range of the cooking chamber temperature.

In a third aspect there is provided a method of cooking a food article in a cooking device, wherein the method is performed by one or more processors and comprises steps of: heating a cooking chamber of the cooking device for cooking the food article; obtaining a plurality of temporally spaced measurements indicative of power drawn by at least one heating component to maintain a cooking chamber temperature; determining, based on the plurality of temporally spaced measurements, a start of a browning state of the food article; and controlling the at least one heating component of the cooking device based on the estimated start time of the browning state.

In certain embodiments of the second and third aspect, the method further comprises: determining, based on the estimated start of the browning state and an initial estimated cooking completion time, a time when an estimated outcome shade of browning of the food article is achieved.

In certain embodiments of the second and third aspect, the method further comprises: receiving a user input indicative of a target outcome shade of browning of the food article; determining an initial estimated cooking completion time based upon the cooking chamber temperature; determining, based on the estimated start of the browning state and the initial estimated cooking completion time, an estimated outcome shade of browning of the food article; and controlling the at least one heating component of the cooking device based on a comparison of the target outcome shade of browning to the estimated outcome shade of browning.

In certain embodiments of the second aspect, the method further comprises: revising a cooking program based on based on at least one of a determined estimated cooking time and the estimated start time of a browning state, and controlling the at least one heating component according to the revised cooking program.

In certain embodiments of the second and third aspect, the at least one heating component is controlled to increase the temperature of the cooking chamber in response to the estimated outcome shade of browning being lighter than the target shade of browning of the food article.

In certain embodiments of the second and third aspect, the method further comprises determining a revised estimated cooking completion time based on the temperature of the cooking chamber being increased, wherein the revised estimated cooking completion time is less than the initial estimated cooking completion time.

In certain embodiments of the second and third aspect, the at least one heating component is controlled to reduce the temperature of the cooking chamber in response to the estimated outcome shade of browning being darker than the target shade of browning of the food article.

In certain embodiments of the second and third aspect, the method further comprises determining a revised estimated cooking completion time based on the temperature of the cooking chamber being reduced, wherein the revised estimated cooking completion time is greater than the initial estimated cooking completion time.

In a fourth aspect there is provided a cooking device including a cooking chamber, at least one heating component and a controller having a processor, wherein the processor of the controller is configured to perform a method according to any one of the first, second and/or aspects or embodiments thereof.

In a fifth aspect there is provided a system for cooking a food article, the system including a cooking device including a cooking chamber and at least one heating component in communication with a first processor of a controller, and a processing system including a second processor, wherein the first and second processor perform, in a distributed manner, a method according to any one of the first, second and/or aspects or embodiments thereof.

In a sixth aspect there is provided one or more computer readable mediums include a plurality of executable instructions, wherein execution of the plurality of executable instructions by one or more processors configure the one or more processors to perform a method according to any one of the first, second and/or aspects or embodiments thereof.

Other aspects and/or embodiments will be appreciated throughout the detailed description.

BRIEF DESCRIPTION OF THE DRAWINGS

Example embodiments should become apparent from the following description, which is given by way of example only, of at least one preferred but non-limiting embodiment, described in connection with the accompanying figures.

DETAILED DESCRIPTION

Figure 1:
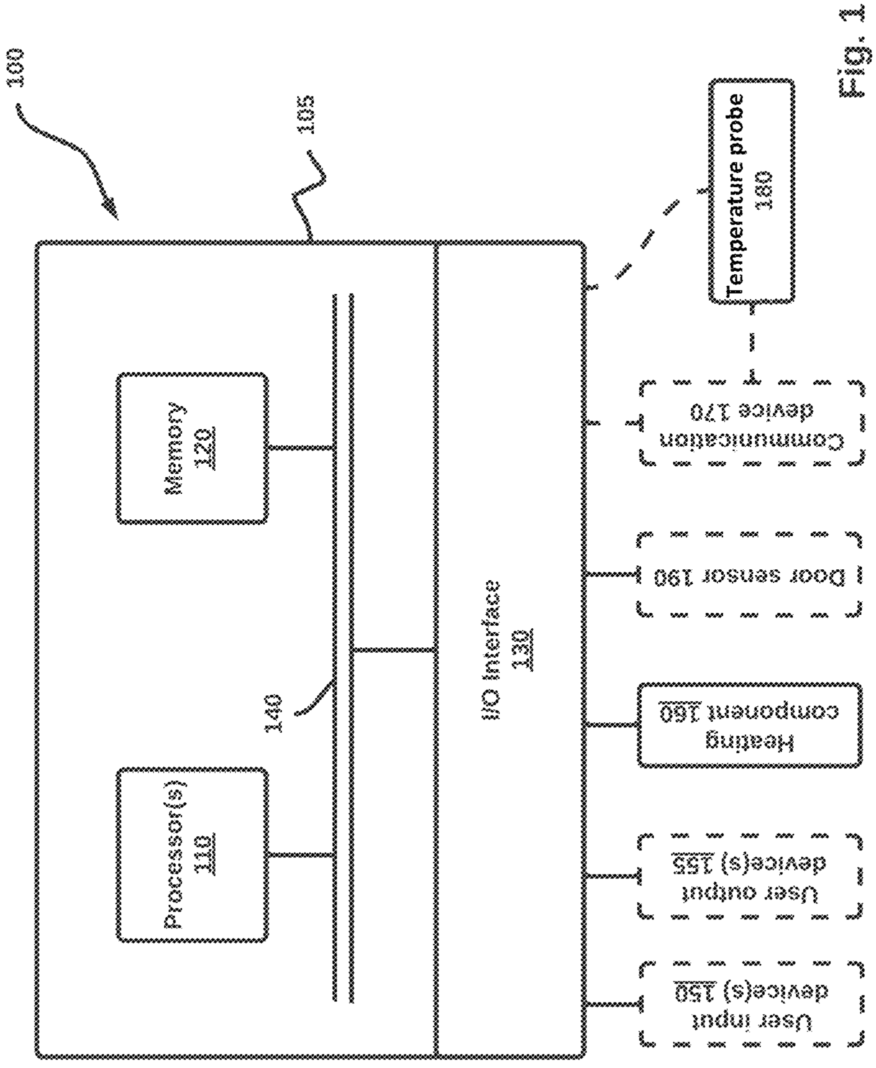
FIG. 1 is a block diagram representing an example control system of a cooking device.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures. In the drawings, features shown in broken line can indicate that the feature is optional.

Figure 11:
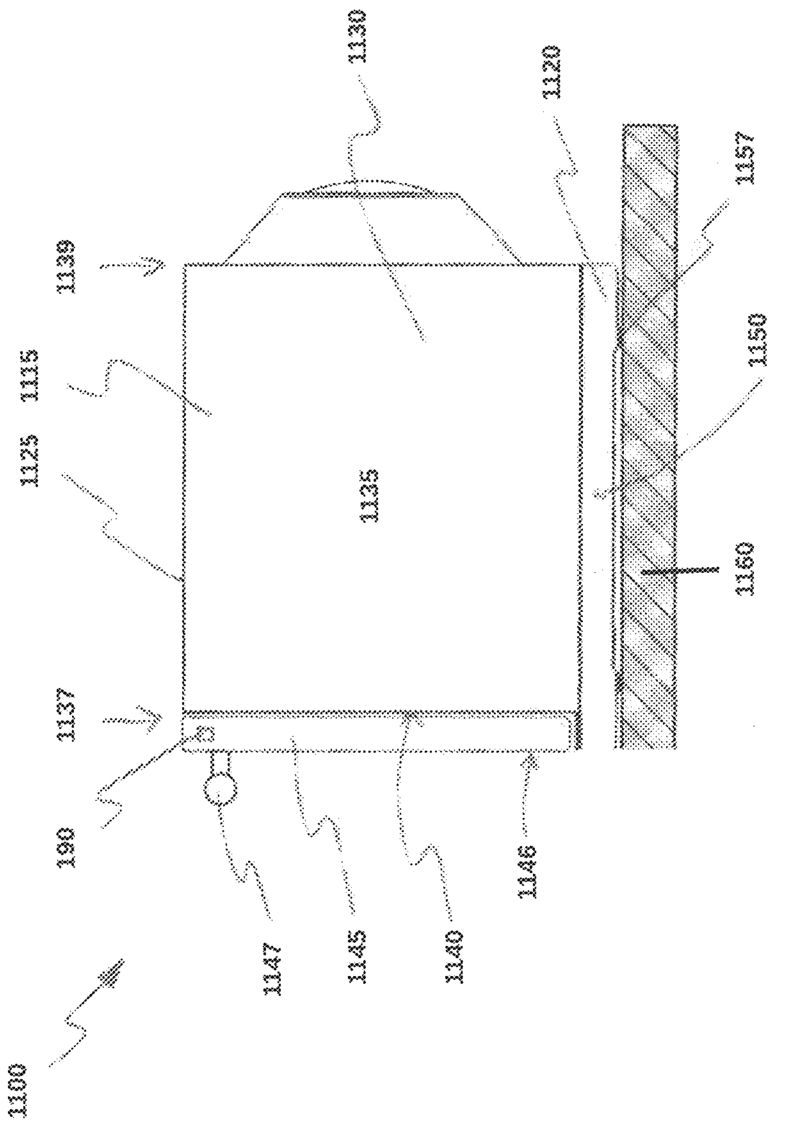
FIG. 11 is a schematic side view of an example of a cooking device in the form of an oven.

Referring to FIG. 1 is shown a block diagram representing an example control system 100 of a cooking device 1100 (see FIG. 11). In particular, the control system 100 comprises a heating component 160 associated with a cooking chamber 1135 (see FIG. 11) of the cooking device 1100 and a controller 105 having one or more processors 110, a memory 120, and i/o (input/output) interface 130, coupled together, directly or indirectly, via a bus 140. As shown in FIG. 11, an example of the cooking device 1100 may be an oven.

Figure 2:
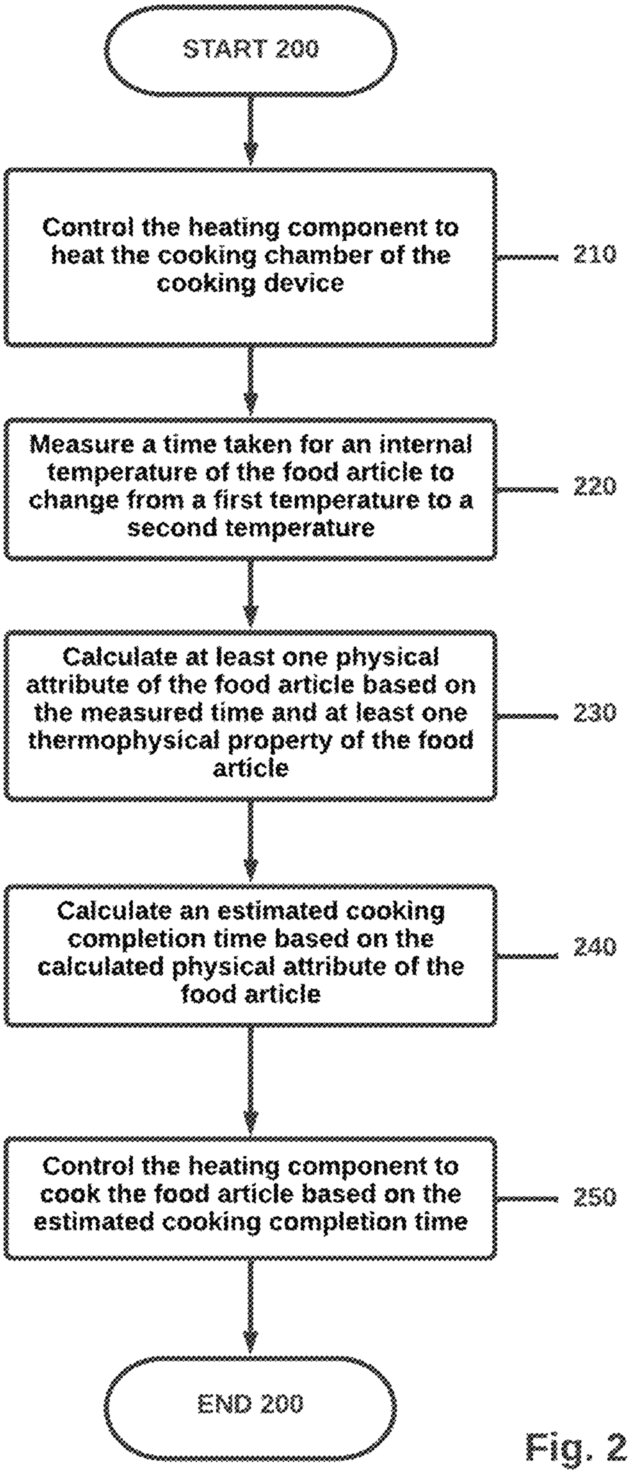
FIG. 2 is a flowchart representing an example method of cooking a food article using the cooking device of FIG. 1.

Referring to FIG. 2 there is shown a flowchart representing an example method 200 of cooking a food article using a cooking device. The steps of the method 200 are performed by one or more processors 110 which are part of the control system 100 depicted in FIG. 1 or distributed between a plurality of processors 110, 1220 in a system 1200 such as that depicted in FIG. 12.

In particular, at step 210, the method 200 includes controlling the heating component 160 to heat the cooking chamber 1135 of the cooking device 1100. At step 220, the method 200 includes measuring a time taken for an internal temperature of the food article to change from a first temperature to a second temperature, wherein the internal temperature is measured by a temperature probe 180 being part of or associated with the cooking device. At step 230, the method 200 includes calculating at least one physical attribute of the food article based on the measured time and at least one thermophysical property of the food article. At step 240, the method 200 includes calculating an estimated cooking completion time based on the calculated physical attribute of the food article. At step 250, the method 200 includes controlling the heating component 160 to cook the food article based on the estimated cooking completion time.

As shown in FIG. 1, the temperature probe 180 may be part of a wireless thermometer which optionally communicates with a communication device 170 of the cooking device 1100. Alternatively, the thermometer may communicate via a wired medium.

Figure 12:
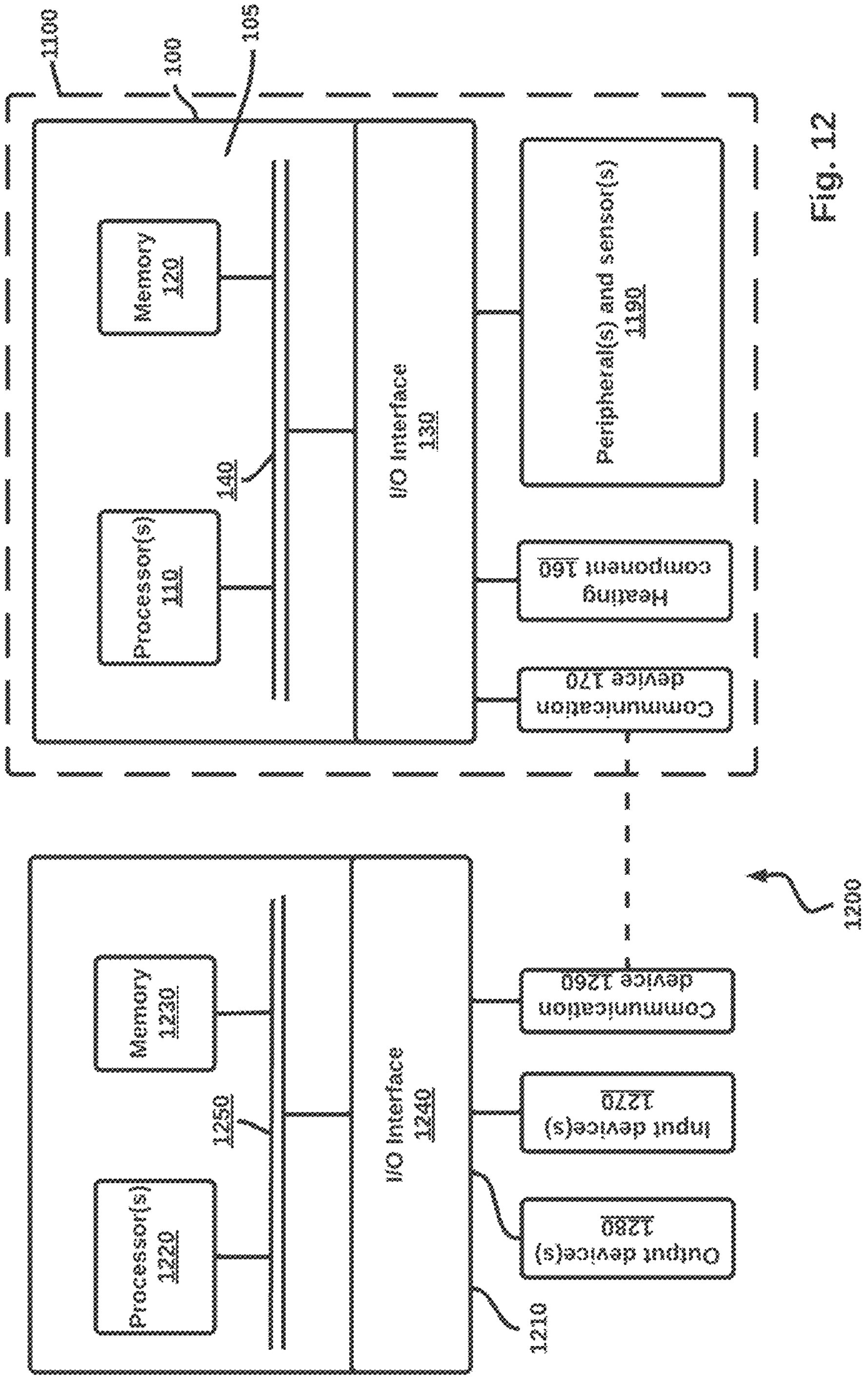
FIG. 12 is a block diagram representing an example system including a cooking device in communication with a processing system.

In a preferable form, the method 200 includes the one or more processors 110 receiving at least one user input. The user input may comprise at least one datum indicative of the food article. The user input may be received via a user input device 150 of the cooking device 1100. Alternatively, as shown in FIG. 12, the user input may be received via a user input device 1270 of the processing system 1210, such as via a touch screen display of a smartphone or the line. The least one user input indicative of the food article can comprise a characteristic of the food including at least one of a food type, a weight of the food, a recipe, and a type of preparation for the food article.

In certain embodiments, the method 200 further comprises the one or more processors 110 calculating the at least one thermophysical property of the food article based on the received user input. The at least one thermophysical property of the food article can comprise a thermal diffusivity of the food article.

Furthermore, in some embodiments, the at least one physical attribute of the food article is a length of the food article. In these embodiments, the length of the food article is calculated, by the one or more processors, according to Equation 1 below:

$$L \propto \sqrt{\alpha t*} \qquad \text{Equation 1}$$

where:

L is the length of the food article;

α is the thermal diffusivity of the food article; and t * is a time taken for the internal temperature of the food article to change from a first temperature to a second temperature.

The one or more processors 110 can be configured to receive an indication of when the food article is placed in the cooking chamber 1135. In some embodiments, that indication of when the food article is placed in the cooking chamber 1135 may be from a door sensor 190 or a user input. In particular, the cooking device 1100 may include a pressure switch which is closed when the door of the cooking chamber 1135 is closed. The pressure switch can be in electrical communication with the processor 110 of the control system 100. In embodiments such as the system of FIG. 11, the user may interact with a graphical user interface presented via the output device 1180 processing system 1210 to indicate that the food article has been placed in the cooking chamber 1135 of the cooking device 1100. In one form, the first temperature may be obtained by the processor 110 prior receiving a first signal indicative of the door being opened and a second temperature may be obtained (e.g., a predefined time period) after the processor 110 receives a second signal indicative of the door being closed. It will be appreciated that once the at least one physical attribute of the food article (such as its characteristic length) is known, it may be possible to predict the actual cooking duration. It will further be appreciated an algorithm-based method of calculating the length as described above may be performed without necessarily having to use an app or a ruler, may also help with keeping the user's fingers clean, and may also accommodate changes to the characteristic length during cooking.

In certain configurations, the cooking device 1100 may be operating according to a cooking program. The cooking program may be stored in memory 120. In these situations, the one or more processors 110 can be configured to update the cooking program to control the heating component 160, wherein updating the cooking program is based on the estimated cooking completion time.

In one embodiment, the estimated cooking completion time can be presented to the user via the user output device 155 or 1280 in the distributed system 1200.

Figure 3:
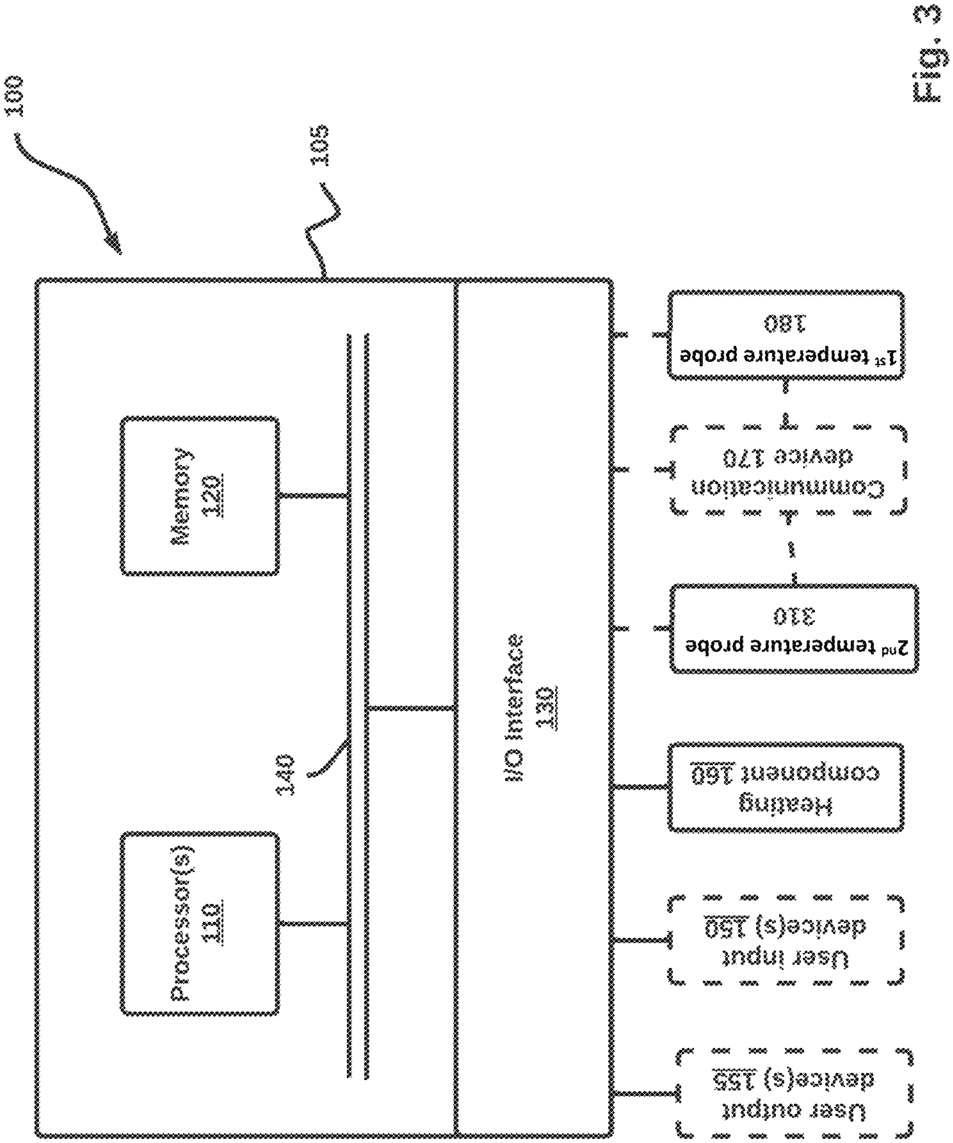
FIG. 3 is a block diagram representing a further example control system of a cooking device.

Referring to FIG. 3 is a block diagram representing a further example control system 100 of the cooking device 1100. Similar components to the control system 100 of FIG. 1 have been shown with common reference numbers. For the purposes of clarity, these features will not be redescribed. The controller 105 of FIG. 3 is further configured to receive signals from a second temperature probe 310 in addition to the first temperature probe 180. The first and/or second temperature probs 180, 310 may communicate wirelessly with a communication device 170 of the control system 100. However, it is possible that the first and/or second temperature probes 180, 310 may communicate with the processor 110 via a wired medium.

Figure 4:
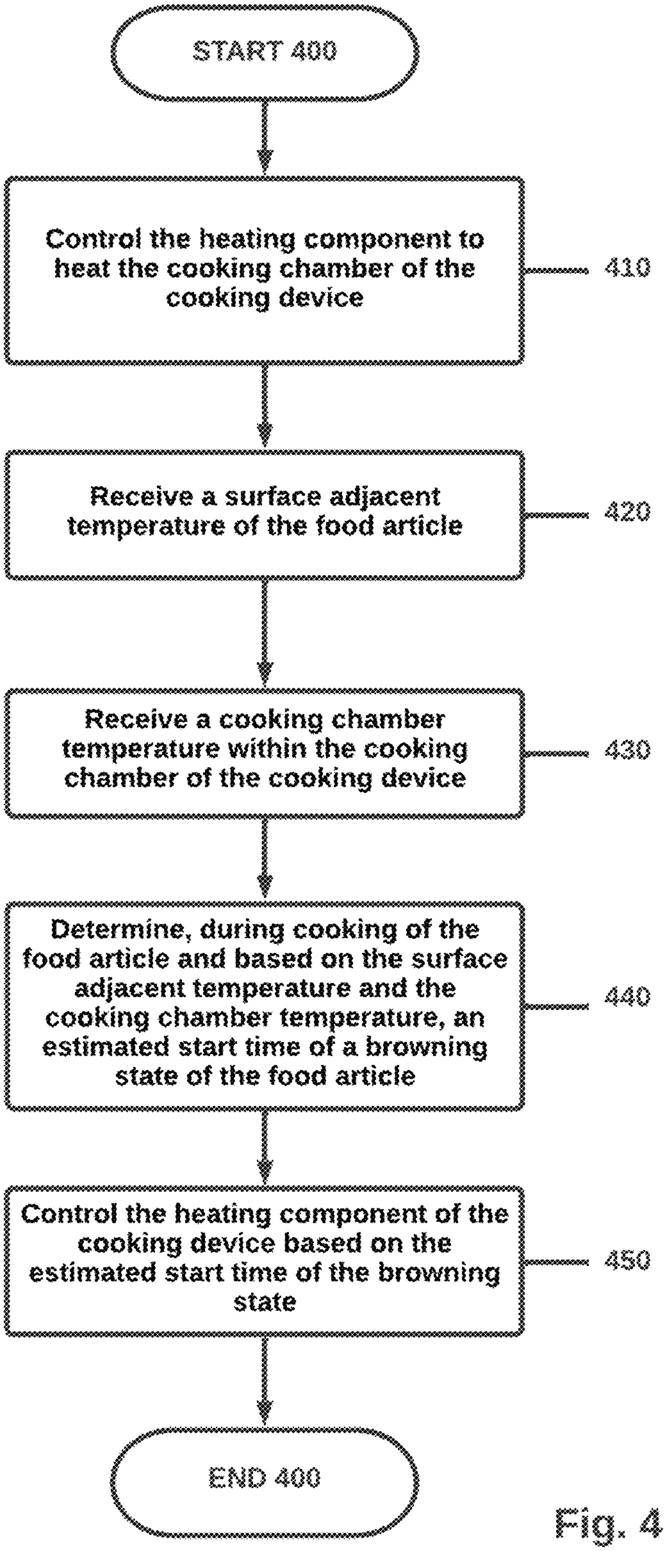
FIG. 4 is a flowchart representing an example method of cooking a food article using the cooking device of FIG. 3.

Referring to FIG. 4 there is shown a flowchart representing an example method 400 of cooking a food article using the control system of FIG. 3 for the cooking device 1100. In particular, at step 410 the method 400 comprises controlling the heating component 160 of the cooking device 1100 to heat a cooking chamber 1135 of the cooking device 1100 for cooking the food article. At step 420, the method 400 comprises receiving, from one of the temperature probes 180, 310, a surface adjacent temperature of the food article, wherein the one or more temperature probes 180, 310 are part of or associated with the cooking device 1100. At step 430, the method 400 comprises receiving, from one of the temperature probes 180, 310, a cooking chamber temperature within the cooking chamber 1135 of the cooking device 1100. At step 440, the method 400 comprises determining, during cooking of the food article and based on the surface adjacent temperature and the cooking chamber temperature, an estimated start time of a browning state of the food article. At step 450, the method 400 comprises controlling the heating component 160 of the cooking device 1100 based on the estimated start time of the browning state.

By determining an estimated start time of a browning state of the food article which is specific for the food article being cooked, the manner which the food article is cooked can be customized accordingly for the desired outcome.

Furthermore, using the surface adjacent temperature advantageously accounts for water content and evaporation of the food article which can vary between two similar food articles. More specifically, the air surrounding the food article is affected by the food article and how air is circulated within the cooking chamber 1135 of the cooking device 1100. Even when there is a convection fan moving air within the cooking chamber 1135 such as with an oven, there is a layer of air near the surface of the food article which does not circulate as quickly. As water evaporates from the food article, the evaporated water cools the surrounding air because of the latent energy of vaporization. The amount of water that is evaporated depends on the temperature of the food's surface, the air temperature, how much the air is moving, and the "water activity" of the surface of the food article. The water activity is the ratio of the water vapor pressure of the food at a particular temperature compared with the water vapor pressure of pure water at that particular temperature. As the surface of the food article desiccates, the water activity reduces and there is less water available to evaporate and cool the air. Therefore, when the air temperature adjacent the surface of the food article (i.e., the surface adjacent temperature) and the cooking chamber temperature start to approach each other and are within a threshold range, the surface of the food article is sufficiently hot for browning to start (i.e., the start of the browning state of the food article according to the Maillard reaction).

The determination of the estimated start time of the browning state of the food article can comprise determining when the surface adjacent temperature of the food article is approaching the cooking chamber temperature. In one example, the surface adjacent temperature of the food article is considered to be approaching the cooking chamber temperature when the surface adjacent temperature is within a threshold range of the cooking chamber temperature. In one example, the surface adjacent temperature of the food article is considered to be approaching the cooking chamber temperature when the surface adjacent temperature is within at least 30% of the current cooking chamber temperature. In one example, the surface adjacent temperature of the food article is considered to be approaching the cooking chamber temperature when the surface adjacent temperature is within at least 20% of the current cooking chamber temperature. In one example, the surface adjacent temperature of the food article is considered to be approaching the cooking chamber temperature when the surface adjacent temperature is within at least 15% of the current cooking chamber temperature. In one example, the surface adjacent temperature of the food article is considered to be approaching the cooking chamber temperature when the surface adjacent temperature is within at least 5% of the current cooking chamber temperature. A time series of temperatures may be obtained to determine a change in surface adjacent temperature over time to determine if the surface adjacent temperature is approaching the cooking chamber temperature whilst being within the threshold range of the cooking chamber temperature.

The desired browning of the food article can be defined by the user. In particular, the method 400 can include the one or more processors 110 receiving at least one datum comprising a user input indicative of a target outcome shade of browning of the food article. This can be received via the user input device 155 of the cooking device 1100 or via the user input device 1270 of the processing system 1210. The processor 110 is configured to receive, from the one or more temperature probes 180, 310, an internal temperature of the food article within the cooking device 1100. In a preferable embodiment, the internal temperature may be sensed using one of the temperature probes 180 provided in the form of a probe which is inserted within the food article. The temperature probe 180 may be in wired or wireless communication with the one or more processors 110 via the communication device 170. The one or more processors 110 are configured to determine an initial estimated cooking completion time based upon the internal temperature. The one or more processors 110 are then able to determine, based on the estimated start of the browning state and the initial estimated cooking completion time, an estimated outcome shade of browning of the food article. The one or more processors 110 are then able to control the heating component 160 of the cooking device 1100 based on a comparison of the target outcome shade of browning to the estimated outcome shade of browning. In one embodiment, the one or more processors 1210, 110 are then able to revise and/or update a cooking program that is currently being applied by the cooking device 100.

The heating component 160 can be controlled to increase the temperature of the cooking chamber 1135 in response to the estimated outcome shade of browning being lighter than the target shade of browning of the food article. For example, the roast may have a lighter outcome shade of browning than desired. Thus, to create a darker shade of browning, the cooking chamber temperature is increased. However, because of this change in cooking chamber temperature, the food article will be cooked in a shorter period of time. Therefore, the one or more processors 110 can be configured to determine and control the heating component 160 according to a revised estimated cooking completion time based on the temperature of the cooking chamber 1135 being increased, wherein the revised estimated cooking completion time is less than the initial estimated cooking completion time.

Alternatively, the heating component 160 can be controlled to reduce the temperature of the cooking chamber 1135 in response to the estimated outcome shade of browning being darker than the target shade of browning of the food article. For example, the roast may have a darker outcome shade of browning than desired. Thus, to create a lighter shade of browning at the completion of the cooking of the food article, the cooking chamber temperature is reduced. However, because of this change in cooking chamber temperature, the food article will be cooked in a longer period of time. Therefore, the one or more processors 110 can be configured to determine and control the heating component 160 according to a revised estimated cooking completion time based on the temperature of the cooking chamber 1135 being reduced, wherein the revised estimated cooking completion time is greater than the initial estimated cooking completion time.

Figure 5:
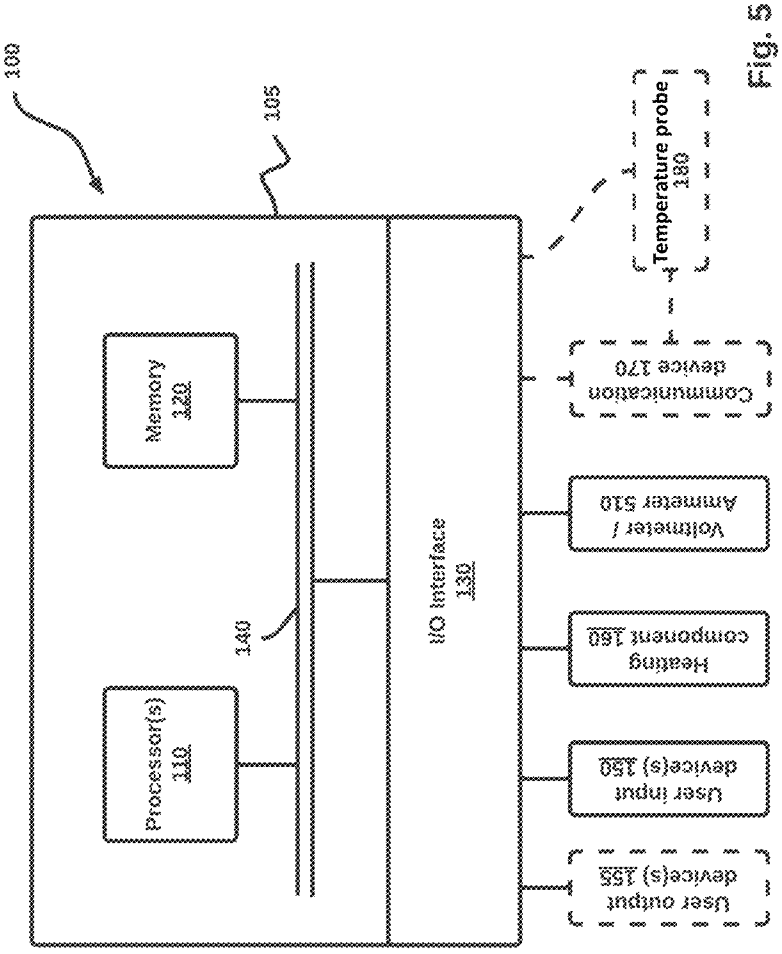
FIG. 5 is a block diagram representing a further example control system of a cooking device.

Referring to FIG. 5 is a block diagram representing a further example control system 100 of a cooking device. Common components to previously described embodiments of the control system 100 use the same reference number and thus for the purposes of clarity are not redescribed. The one or more processors 110 are configured determine power being drawn by the heating component 160. In one example, the one or more processors 110 are configured to determine the pulse width modulation (PWM) being applied to the heating component 160. For example, the PWM being applied may be stored in memory and can be retrieved by the one or more processors 110. In an alternate embodiment, the one or more processors 110 are configured to receive one or more electrical signals or measurements indicative of the power being drawn by the heating component 160. For example, the one or more electrical signals or measurements may be indicative of a voltage and/or current drawn by the heating component. As shown in FIG. 5, the control system 100 can include a voltmeter/ammeter 510 to generate the one or more electrical signals used for deriving the power being drawn by the heating component 160. In one form, the memory 120 coupled to the one or more processors 110 has stored therein a known resistance of the heating component 160 which can be used in combination with the value indicated by the electrical signal to calculate, using known mathematical relationships (e.g., $P=I^2R$), the drawn power by the heating component 160.

In one form, the revised estimated cooking completion time can be presented to the user via the user output device 155 or 1280 in the distributed system 1200. Furthermore, estimated browning outcome of the food article based on the revised estimated cooking completion time may also be presented to the user via the user output device 155 (via 170) or 1280 in the distributed system 1200.

Figure 6:
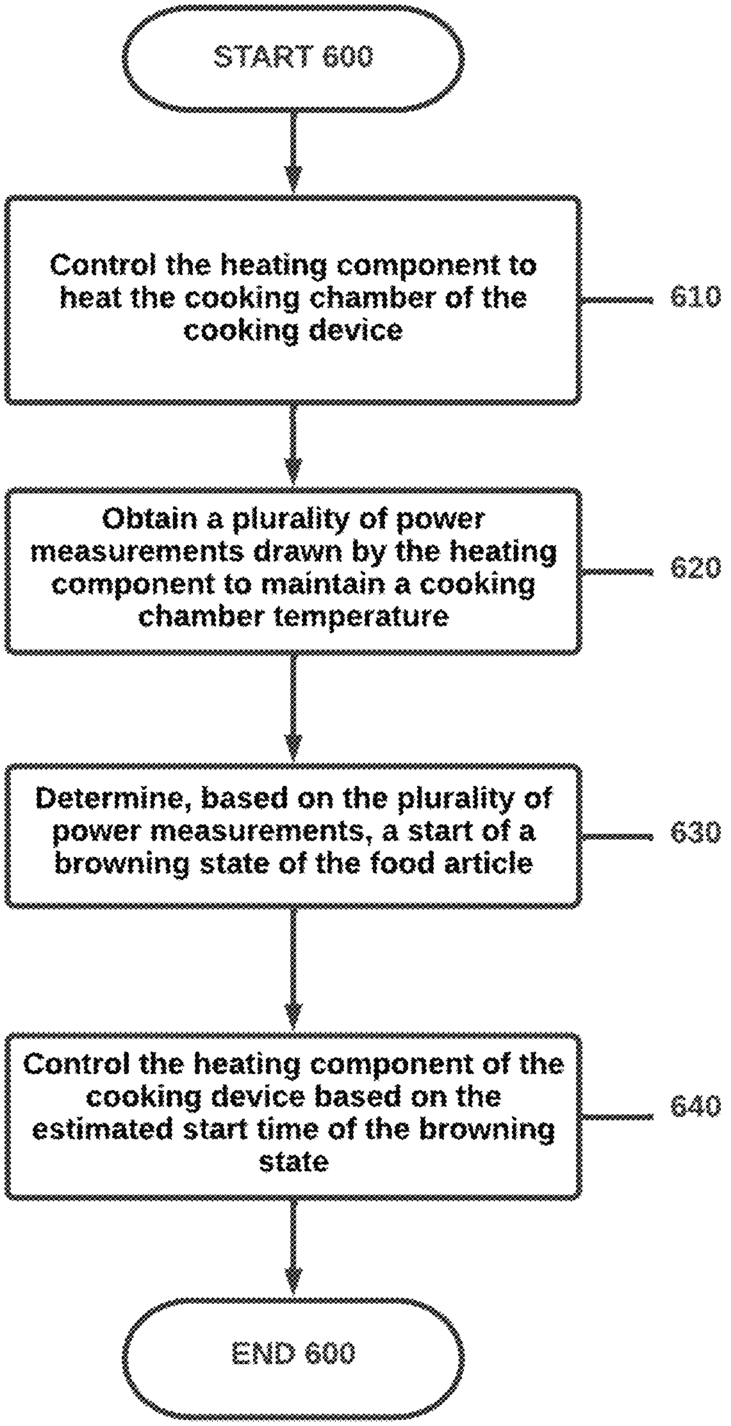
FIG. 6 is a flowchart representing an example method of cooking a food article using the cooking device of FIG. 5.

Referring to FIG. 6 there is shown a flowchart representing an example method 600 of cooking a food article using the cooking device of FIG. 5.

In particular, at step 610, the method 600 includes the one or more processors 110 controlling the heating component 160 of the cooking device 1100 to heat a cooking chamber 1135 of the cooking device 1100 for cooking the food article. At step 620, the method 600 includes the one or more processors 110 obtaining a plurality of measurements indicative of power drawn by the heating component 160 to maintain a cooking chamber temperature, wherein each measurement is obtained at a different point in time compared to a remainder of measurements. At step 630, the method 600 includes the one or more processors 110 determining, based on the plurality of measurements, a start of a browning state of the food article. At step 640, the method 600 includes controlling the heating component 160 of the cooking device 1100 based on the estimated start time of the browning state.

By determining an estimated start time of a browning state of the food article which is specific for the food article being cooked, the manner which the food article is cooked can be customized accordingly for the desired outcome.

A desired browning of the food article can be defined by the user and used in combination with the estimated start of the browning state of the food article for controlling the operation of the heating component 160 to achieve the desired outcome. In particular, the method 600 can include the one or more processors 110 receiving a user input indicative of a target outcome shade of browning of the food article. This can be received via the user input device 150 of the cooking device 1100 or via the user input device 1270 of the processing system 1210. The processor(s) 110 are configured to receive, from the one or more temperature probes, an internal temperature of the food article within the cooking device 1100. In a preferable form, the internal temperature may be sensed using the temperature probe 180 which is inserted within the food article. The temperature probe 180 may be in wired or wireless communication with the one or more processors 110 via a communication device 170. The one or more processors 110 are configured to determine an initial estimated cooking completion time based upon the internal temperature. The one or more processors 110 are then able to determine, based on the estimated start of the browning state and the initial estimated cooking completion time, an estimated outcome shade of browning of the food article. The one or more processors 110 are then able to control the heating component 160 of the cooking device 1100 based on a comparison of the target outcome shade of browning to the estimated outcome shade of browning.

In an alternate arrangement, if an internal temperature of the of the food article cannot be obtained using a temperature probe, the one or more processors 110 can be configured to determine an initial estimated cooking completion time based upon the cooking chamber temperature received from the temperature probe 180 which can be mounted within the cooking chamber 1135 of the cooking device 1100. The one or more processors 110 are then configured to determine, based on the estimated start of the browning state and the initial estimated cooking completion time, an estimated outcome shade of browning of the food article. The one or more processors 110 are configured to control the heating component 160 of the cooking device 1100 based on a comparison of the target outcome shade of browning to the estimated outcome shade of browning.

The heating component 160 can be controlled to increase the temperature of the cooking chamber 1135 in response to the estimated outcome shade of browning being lighter than the target shade of browning of the food article. For example, the roast may have a lighter outcome shade of browning than desired. Thus, to create a darker shade of browning, the cooking chamber temperature is increased. However, because of this change in cooking chamber temperature, the food article will be cooked in a shorter period of time. Therefore, the one or more processors 110 can be configured to determine and control the heating component 160 according to a revised estimated cooking completion time based on the temperature of the cooking chamber 1135 being increased, wherein the revised estimated cooking completion time is less than the initial estimated cooking completion time.

Alternatively, the heating component 160 can be controlled to reduce the temperature of the cooking chamber 1135 in response to the estimated outcome shade of browning being darker than the target shade of browning of the food article. For example, the roast may have a darker outcome shade of browning than desired. Thus, to create a lighter shade of browning at the completion of the cooking of the food article, the cooking chamber temperature is reduced. However, because of this change in cooking chamber temperature, the food article will be cooked in a longer period of time. Therefore, the one or more processors 110 can be configured to determine and control the heating component 160 according to a revised estimated cooking completion time based on the temperature of the cooking chamber 1135 being reduced, wherein the revised estimated cooking completion time is greater than the initial estimated cooking completion time.

In one form, the revised estimated cooking completion time can be presented to the user via the user output device 155 or 1280 in the distributed system 1200. Furthermore, estimated browning outcome of the food article based on the revised estimated cooking completion time may also be presented to the user via the user output device 155 or 1280 in the distributed system 1200.

Figure 7:
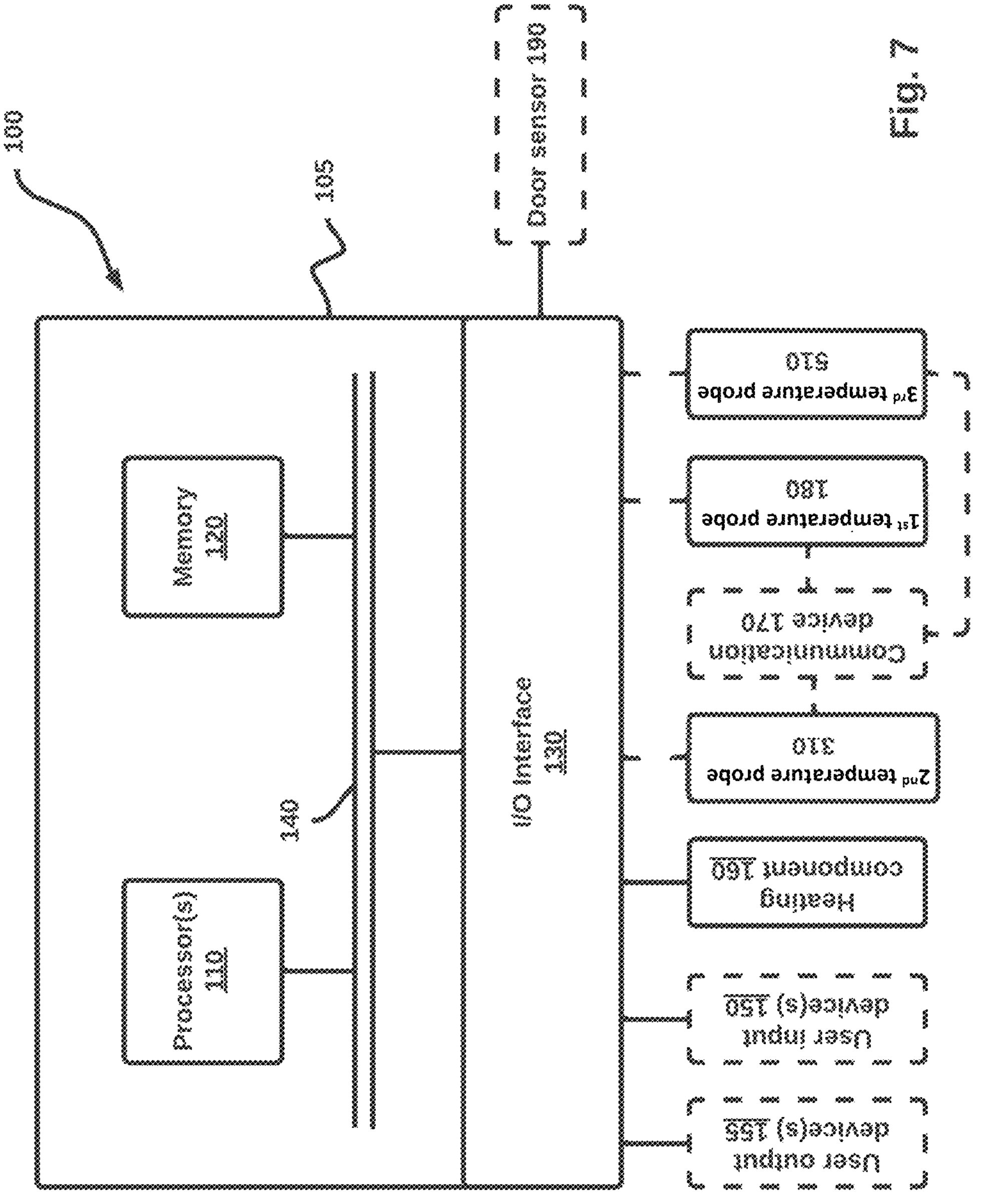
FIG. 7 is a block diagram representing a further example control system of a cooking device.

Referring to FIG. 7 is a block diagram representing a further example control system 100 of the cooking device 1100. The control system 100 of FIG. 7 is a combination of FIGS. 1 and 3. Similar components to the control system of FIGS. 1 and 3 have been shown with common reference numbers. For the purposes of clarity, these features will not be redescribed. The control system 100 includes a first temperature probe 180 for obtaining internal temperature of the food article, a second temperature probe 310 for obtaining a surface adjacent temperature, and a third temperature probe 510 for obtaining a cooking chamber temperature. The temperature probes 180, 310, 510 can communicate wirelessly via the communication device or via a wired medium.

Figure 8A:
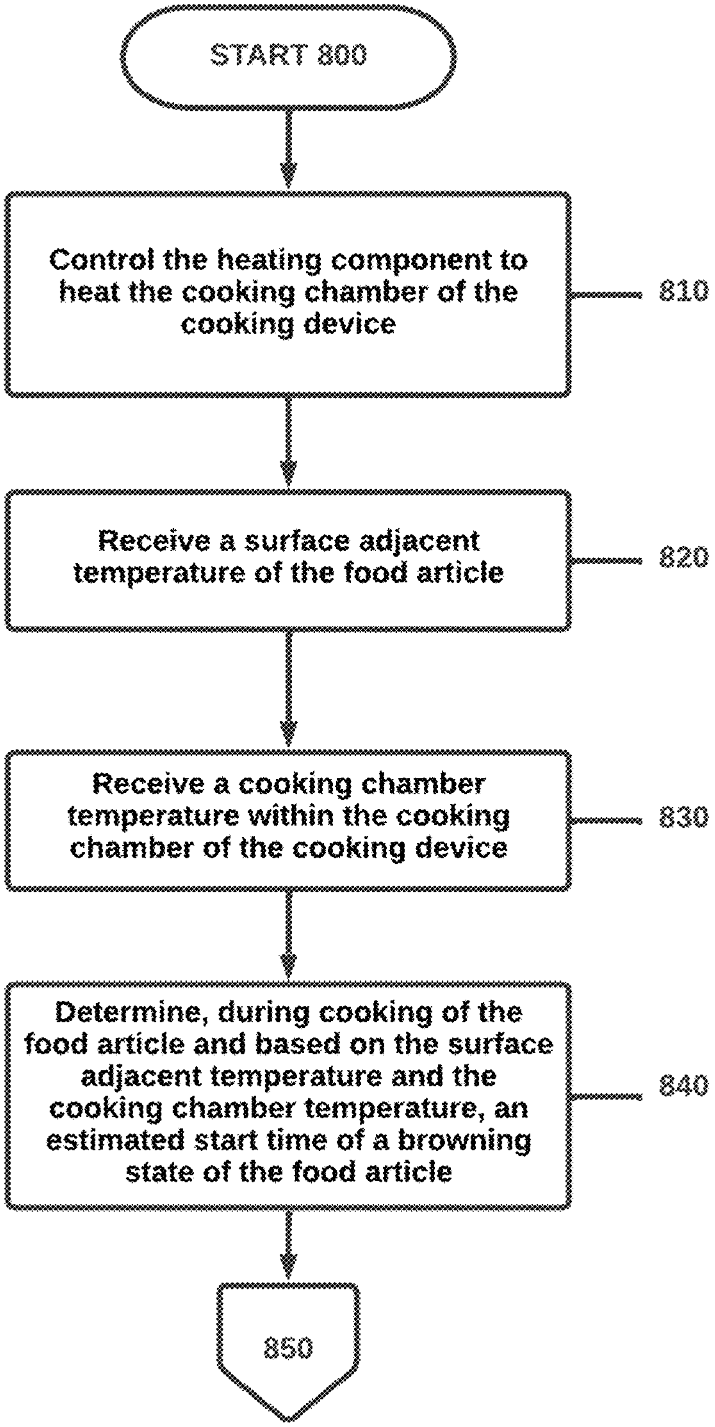
FIGS. 8A and 8B is a flowchart representing a further example method of cooking a food article using the cooking device of FIG. 7.
Figure 8B:
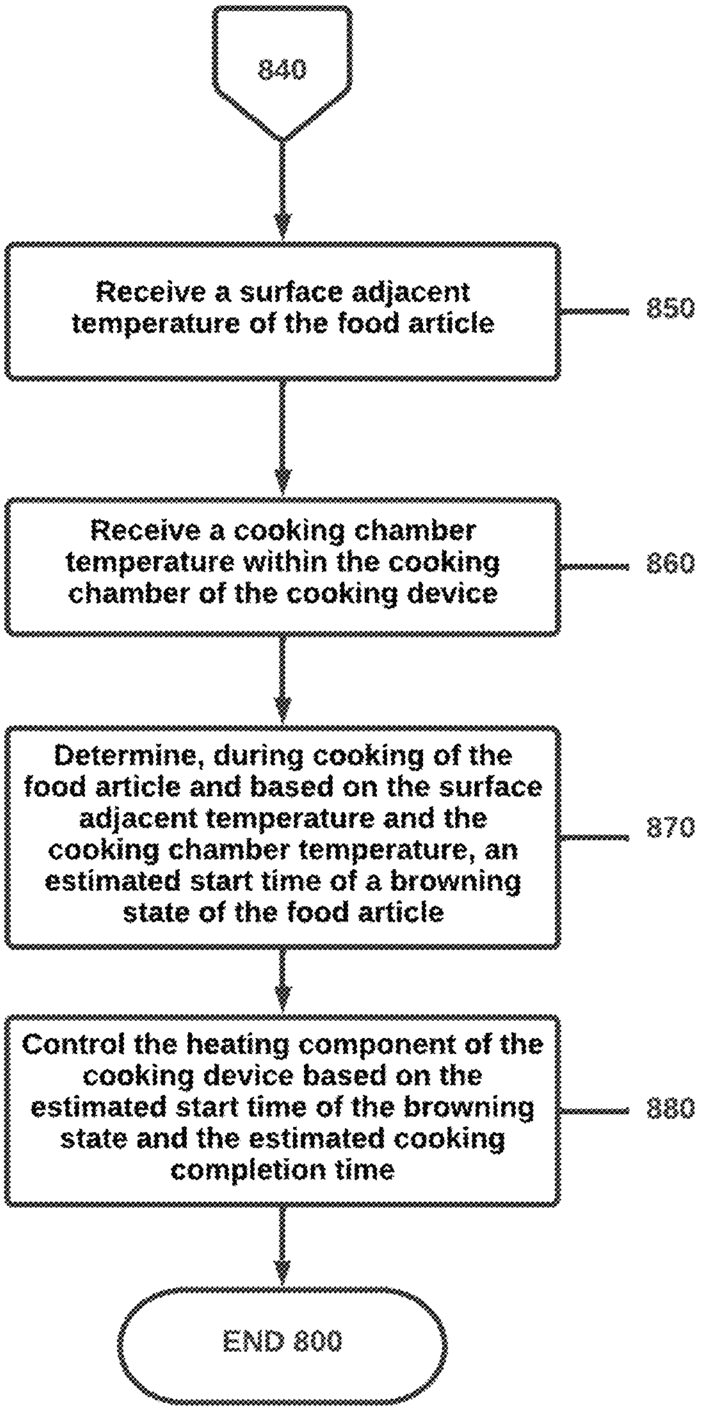

FIG. 8 is a flowchart representing a further example method 800 of cooking a food article using the cooking device of FIG. 7. In particular, the method 200 and 400 are combined into method 800. More specifically, at step 810, the method 800 includes the one or more processors 110 controlling the heating component 160 to heat the cooking chamber 1135 of the cooking device 1100. At step 820, the method 800 includes the one or more processors 110 measuring a time taken for an internal temperature of the food article to change from a first temperature to a second temperature, wherein the internal temperature is measured by temperature probe 180. At step 830, the method 800 includes the one or more processors 110 calculating at least one physical attribute of the food article based on the measured time and at least one thermophysical property of the food article. At step 840, the method 800 includes the one or more processors 110 calculating an initial estimated cooking completion time based on the calculated physical attribute of the food article. At step 850, the method 800 comprises the one or more processors 110 receiving, from the temperature probe 310, a surface adjacent temperature of the food article. At step 860, the method 800 comprises receiving, from temperature probe 510, a cooking chamber temperature within the cooking chamber 1135 of the cooking device 1100. At step 870, the method 800 comprises determining, during cooking of the food article and based on the surface adjacent temperature and the cooking chamber temperature, an estimated start time of a browning state of the food article. At step 880, the method 800 comprises controlling the heating component 160 of the cooking device 1100 based on the estimated start time of the browning state and the estimated cooking completion time.

In a preferable form, the method 800 includes the one or more processors 110 receiving at least one user input indicative of the food article. For example, the user input may be received via a user input device 155 of the cooking device 1100. Alternatively, as shown in FIG. 12, the user input may be received via a user input device 1270 of the processing system 1210, such as via a touch screen display. The least one user input indicative of the food article can comprise a characteristic of the food including at least one of a food type, a weight of the food, a recipe, and a type of preparation for the food article.

The method 800 can comprise the one or more processors 110 calculating the at least one thermophysical property of the food article based on the received user input. The at least one thermophysical property of the food article can comprise a thermal diffusivity of the food article. Furthermore, the at least one physical attribute of the food article is a length of the food article. In these embodiments, the length of the food article is calculated, by the one or more processors 100, according to Equation 1 above.

The one or more processors 110 can be configured to receive an indication of when the food article is placed in the cooking chamber 1135 from a door sensor 190 or the user input device 150. In particular, the cooking device 1100 may include a pressure switch which is closed when the door of the cooking chamber 1135 is closed. The pressure switch can be in electrical communication with the processor 110 of the control system 100. The processor 110 can obtain the first temperature prior to a first signal being received indicative of the temperature prior to food article being within the cooking chamber 1135 and obtain the second temperature a predefined time period (e.g., stored in memory 120) after receiving a second signal indicative of the food article being placed within the cooking chamber 1135. In alternate embodiments, the user may interact with a graphical user interface presented via the user input device 1270 of processing system 1210 to indicate that the food article has been placed in the cooking chamber 1135 of the cooking device 1100.

In certain configurations, the cooking device 1100 may be operating according to a cooking program. In these situations, the one or more processors 110 can be configured to update a cooking program to control the heating component 160, wherein updating the cooking program is based on the estimated cooking completion time.

The determination of the estimated start time of the browning state of the food article can comprise determining when the surface adjacent temperature of the food article is approaching the cooking chamber temperature and within a threshold range of the cooking chamber temperature. Therefore, a time series of temperatures may be obtained by the one or more processors 110 to determine a change in surface adjacent temperature over time to determine if the surface adjacent temperature is approaching the cooking chamber temperature whilst being within the threshold range of the cooking chamber temperature.

The desired browning of the food article can be defined by the user. In particular, the method 800 can include the one or more processors 110 receiving a user input indicative of a target outcome shade of browning of the food article. This can be received via the user input device 150 of the cooking device 1100 or via the user input device 1270 of the processing system 1210. The processors 110 are configured to receive, from the temperature probe 180, an internal temperature of the food article within the cooking device 1100. In a preferable form, the internal temperature may be sensed using a temperature probe which is inserted within the food article. The temperature probe may be in wired or wireless communication with the one or more processors 110. The one or more processors are configured to determine an initial estimated cooking completion time based upon the internal temperature. The one or more processors are then able to determine, based on the estimated start of the browning state and the initial estimated cooking completion time, an estimated outcome shade of browning of the food article. The one or more processors 110 are then able to control the heating component 160 of the cooking device 1100 based on a comparison of the target outcome shade of browning to the estimated outcome shade of browning.

The heating component 160 can be controlled to increase the temperature of the cooking chamber 1135 in response to the estimated outcome shade of browning being lighter than the target shade of browning of the food article. For example, the roast may have a lighter outcome shade of browning than desired. Thus, to create a darker shade of browning, the cooking chamber temperature is increased. However, because of this change in cooking chamber temperature, the food article will be cooked in a shorter period of time. Therefore, the one or more processors 110 can be configured to determine and control the heating component 160 according to a revised estimated cooking completion time based on the temperature of the cooking chamber 1135 being increased, wherein the revised estimated cooking completion time is less than the initial estimated cooking completion time.

Alternatively, the heating component 160 can be controlled to reduce the temperature of the cooking chamber 1135 in response to the estimated outcome shade of browning being darker than the target shade of browning of the food article. For example, the roast may have a darker outcome shade of browning than desired. Thus, to create a lighter shade of browning at the completion of the cooking of the food article, the cooking chamber temperature is reduced. However, because of this change in cooking chamber temperature, the food article will be cooked in a longer period of time. Therefore, the one or more processors 110 can be configured to determine and control the heating component 160 according to a revised estimated cooking completion time based on the temperature of the cooking chamber 1135 being reduced, wherein the revised estimated cooking completion time is greater than the initial estimated cooking completion time.

In one form, the revised estimated cooking completion time can be presented to the user via the user output device 155 or 1280 in the distributed system 1200. Furthermore, estimated browning outcome of the food article based on the revised estimated cooking completion time may also be presented to the user via the user output device 155 or 1280 in the distributed system 1200.

Figure 9:
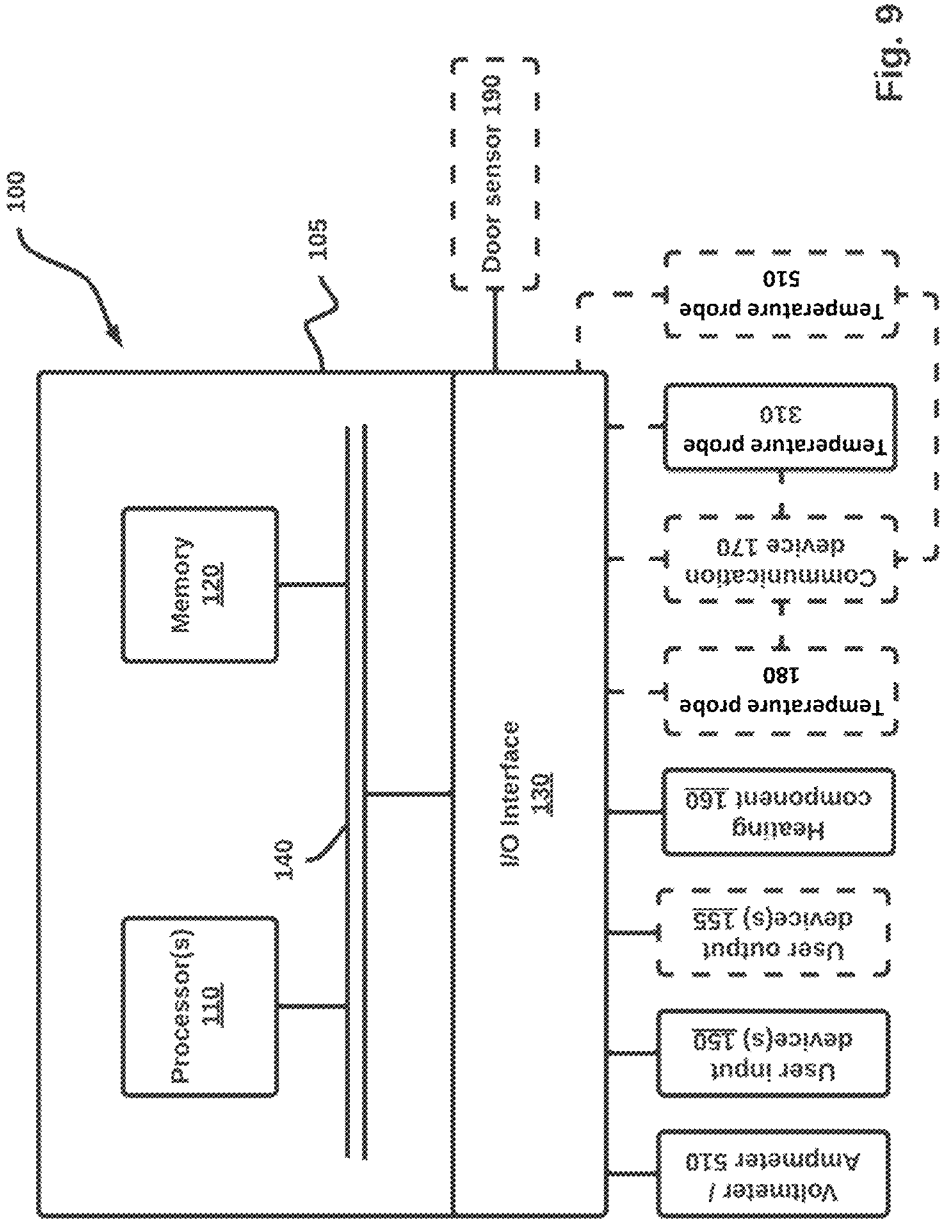
FIG. 9 is a block diagram representing a further example control system of a cooking device.

Referring to FIG. 9 is a block diagram representing a further example control system 100 of the cooking device 1100. The control system 100 of FIG. 9 is a combination of FIGS. 1 and 5. Similar components to the control system of FIGS. 1 and 5 have been shown with common reference numbers. For the purposes of clarity, these features will not be redescribed.

Figure 10A:
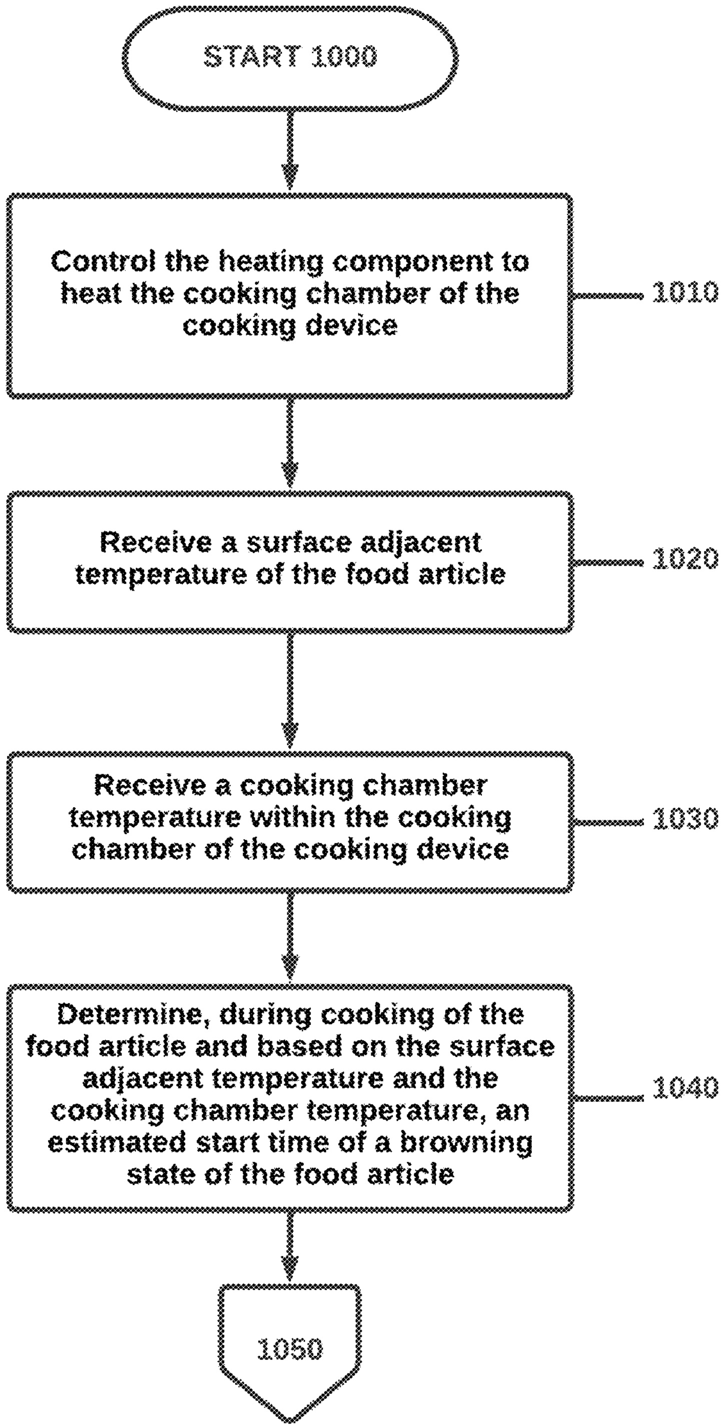
FIGS. 10A and 10B is a flowchart representing a further example method of cooking a food article using the cooking device of FIG. 9.
Figure 10B:
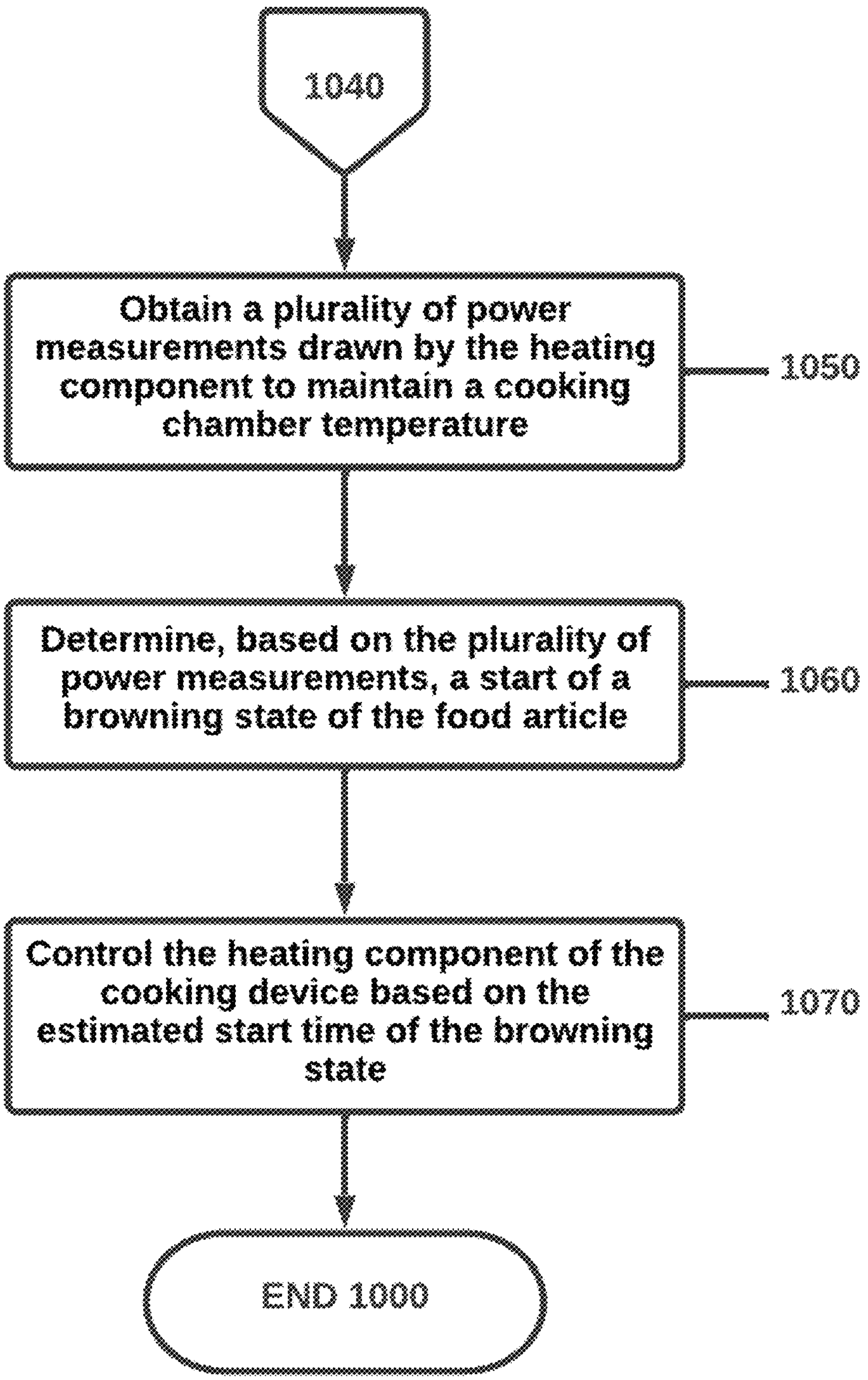

Referring to FIG. 10 there is shown a flowchart representing a further example method 1000 of cooking a food article using the cooking device. In particular, the method 200 and 600 are combined into method 1000. More specifically, at step 1010, the method 1000 includes controlling the heating component 160 to heat the cooking chamber 1135 of the cooking device 1100. At step 1020, the method 1000 includes measuring a time taken for an internal temperature of the food article to change from a first temperature to a second temperature, wherein the internal temperature is measured by temperature probe 180 being part of or associated with the cooking device 1100. At step 1030, the method 1000 includes calculating at least one physical attribute of the food article based on the measured time and at least one thermophysical property of the food article. At step 1040, the method 1000 includes calculating an estimated cooking completion time based on the calculated physical attribute of the food article. At step 1050, the method 1000 includes the one or more processors 110 obtaining a plurality of measurements indicative of power drawn by the heating component 160 to maintain a cooking chamber temperature, wherein each measurement is obtained at a different point in time compared to a remainder of measurements. At step 1060, the method 1000 includes the one or more processors 110 determining, based on the plurality of measurements, a start of a browning state of the food article. At step 1070, the method 1000 includes controlling the heating component 160 of the cooking device 1100 based on the estimated start time of the browning state and the estimated cooking completion time.

In a preferable form, the method 1000 includes the one or more processors 110 receiving at least one user input indicative of the food article. For example, the user input may be received via the user input device 150 of the cooking device 1100. Alternatively, as shown in FIG. 12, the user input may be received via a user input device 1270 of the processing system 1210, such as via a touch screen display. The least one user input indicative of the food article can comprise a characteristic of the food including at least one of a food type, a weight of the food, a recipe, and a type of preparation for the food article.

The method 1000 can comprise the one or more processors 110 calculating the at least one thermophysical property of the food article based on the received user input. The at least one thermophysical property of the food article can comprise a thermal diffusivity of the food article. Furthermore, the at least one physical attribute of the food article is a length of the food article. In these embodiments, the length of the food article is calculated, by the one or more processors 110, according to Equation 1 above.

The one or more processors 110 can be configured to receive an indication of when the food article is placed in the cooking chamber 1135 from a door sensor 190 or a user input device 1. In particular, the cooking device 1100 may include a pressure switch which is closed when the door of the cooking chamber 1135 is closed. The pressure switch can be in electrical communication with the processor of the control system. The processor 110 can obtain the first temperature prior to a first signal being received indicative of the temperature prior to food article being within the cooking chamber 1135 and obtain the second temperature a predefined time period (e.g., stored in memory 120) after receiving a second signal indicative of the food article being placed within the cooking chamber 1135. In alternate embodiments such as the system of FIG. 12, the user may interact with a graphical user interface presented via the processing system 1210 to indicate that the food article has been placed in the cooking chamber 1135 of the cooking device 1100.

In certain configurations, the cooking device 1100 may be operating according to a cooking program. In these situations, the one or more processors 110 can be configured to update the cooking program to control the heating component 160, wherein updating the cooking program is based on the estimated cooking completion time.

A desired browning of the food article can be defined by the user and used in combination with the estimated start of the browning state of the food article for controlling the operation of the heating component to achieve the desired outcome. In particular, the method 1000 can include the one or more processors 110 receiving a user input indicative of a target outcome shade of browning of the food article. This can be received via a user input device 150 of the cooking device 1100 or via the user input device 1270 of the processing system 1210. The processor(s) 110 are configured to receive, from the temperature probe 180, an internal temperature of the food article within the cooking device 1100. In a preferable form, the internal temperature may be sensed using the temperature probe 180 which is inserted within the food article. The temperature probe 180 may be in wired or wireless communication with the one or more processors 110. The one or more processors 110 are configured to determine an initial estimated cooking completion time based upon the internal temperature. The one or more processors 110 are then able to determine, based on the estimated start of the browning state and the initial estimated cooking completion time, an estimated outcome shade of browning of the food article. The one or more processors 110 are then able to control the heating component 160 of the cooking device 1100 based on a comparison of the target outcome shade of browning to the estimated outcome shade of browning.

The heating component 160 can be controlled to increase the temperature of the cooking chamber 1135 in response to the estimated outcome shade of browning being lighter than the target shade of browning of the food article. For example, the roast may have a lighter outcome shade of browning than desired. Thus, to create a darker shade of browning, the cooking chamber temperature is increased. However, because of this change in cooking chamber temperature, the food article will be cooked in a shorter period of time. Therefore, the one or more processors 110 can be configured to determine and control the heating component 160 according to a revised estimated cooking completion time based on the temperature of the cooking chamber 1135 being increased, wherein the revised estimated cooking completion time is less than the initial estimated cooking completion time.

Alternatively, the heating component 160 can be controlled to reduce the temperature of the cooking chamber 1135 in response to the estimated outcome shade of browning being darker than the target shade of browning of the food article. For example, the roast may have a darker outcome shade of browning than desired. Thus, to create a lighter shade of browning at the completion of the cooking of the food article, the cooking chamber temperature is reduced. However, because of this change in cooking chamber temperature, the food article will be cooked in a longer period of time. Therefore, the one or more processors 110 can be configured to determine and control the heating component 160 according to a revised estimated cooking completion time based on the temperature of the cooking chamber 1135 being reduced, wherein the revised estimated cooking completion time is greater than the initial estimated cooking completion time.

In one form, the revised estimated cooking completion time can be presented to the user via the user output device 155 or 1280 in the distributed system 1200. Furthermore, estimated browning outcome of the food article based on the revised estimated cooking completion time may also be presented to the user via the user output device 155 or 1280 in the distributed system 1200.

Referring to FIG. 11 there is shown a schematic side view of an example cooking device provided in the form of an oven. The oven 1100 includes a body 1115 having a base 1120, a ceiling 1125, and a wall 1130 extending between the base 1120 and the ceiling 1125. The wall 1130 at least partially surrounds and defines a cooking chamber 1135. The oven 1100 has a front portion 1137 and a rear portion 1139. At the front portion 1137, the oven 1100 also includes an opening 1140 providing a passage through which the food item to be cooked is to be moved in and out of the cooking cavity 1135. The oven 1100 further includes a door 1145 enclosing the opening 1140. The door 1145 is hingedly connected to a lower portion 1146 of the door 1145 such that the door 1145 is moveable between a closed position in which the opening 1140 is enclosed and an open position in which the opening 1140 is at least partially exposed. The door 1145 includes a handle 1147 grippable by a user to move the door 1145 between the closed and open positions. The base 1120 includes a base cavity and an opening 55 providing access Into the base cavity. The opening 1155 is preferably located centrally and adjacent the front portion 1137 of the oven 1100, generally below the area that the door 1145 is located. The base 1120 also includes foot portions 1157 for supporting the oven 1100 on a surface 1160 (such as a surface of a kitchen benchtop). An example of the oven 1100 is disclosed by PCT Application No. PCT/AU202/050971 which is herein incorporated by reference in its entirety.

As shown in FIG. 12, the cooking device 1100 may be part of a distributed system 1200 for cooking the food article, wherein the system 1200 includes a first processor 110 being part of the control system 100 of the cooking device 1100 which further includes a communication device 170, and a second processor 1220 being part of the processing system 1210. The i/o interface 130 has connected thereto one or more peripherals and/or sensors 1190 as discussed above throughout the various examples. The processing system 1210 further includes a memory 1230, an input device 1270, an output device 1280, and a communication device 1260 coupled to the processor 1220 via a respective bus 1240. In one example, the processing system 1210 may be a mobile processing system such as a mobile communication device (e.g., smart phone; tablet; etc.). The processors 110, 1220 can be in communication with each other, preferably via a wireless communication, via the respective communication devices 170, 1260.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

Throughout this specification and claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A method of cooking a food article in a cooking device, the cooking device including a cooking chamber and at least one heating component, wherein the method is performed by one or processors comprising steps of:

heating the cooking chamber of the cooking device;

measuring a time taken for an internal temperature of the food article to change from a first temperature to a second temperature, wherein the internal temperature is measured by one or more temperature probes being part of or associated with the cooking device;

calculating at least one physical attribute of the food article based on the measured time and at least one thermophysical property of the food article;

calculating an estimated cooking completion time based on the calculated physical attribute of the food article; and controlling the at least one heating component to cook the food article based on the estimated cooking completion time.

2. The method according to claim 1, further comprising receiving at least one user input indicative of the food article.

3. The method according to claim 2, wherein the least one user input indicative of the food article comprises a characteristic of the food including at least one of a food type, a weight of the food, a recipe, and a type of preparation for the food article.

4. The method according to claim 1, further comprising calculating or receiving the at least one thermophysical property of the food article based on the received user input.

5. The method according to claim 1, wherein the at least one thermophysical property of the food article comprises a thermal diffusivity of the food article.

6. The method according to claim 5, wherein the at least one physical attribute of the food article is a length of the food article.

7. The method according to claim 6, wherein the length of the food article is calculated, by the one or more processors, according to:

$$L \propto \sqrt{\alpha t^*}$$

wherein:

L is the length of the food article;

$\alpha$ is the thermal diffusivity of the food article; and t * is a time taken for the internal temperature of the food article to change from a first temperature to a second temperature.

8. The method according to claim 1, further comprising receiving an indication of when the food article is placed in the cooking chamber.

9. The method according to claim 1, further comprising updating a cooking program being applied by the one or more processors to control the at least one heating component, wherein updating the cooking program is based on the estimated cooking completion time.

10. The method according to claim 1, further comprising:

determining an estimated start time of a browning state of the food article based on a surface adjacent temperature and the cooking chamber temperature.

11. The method according to claim 10, wherein determining the estimated start time of the browning state of the food article comprises determining when the surface adjacent temperature of the food article approaches the cooking chamber temperature.

12. The method according to claim 11, wherein the surface adjacent temperature of the food article is determined to approach the cooking chamber temperature when surface adjacent temperature is within a threshold range of the cooking chamber temperature.

13. The method according to claim 1, wherein the method further comprises:

determining an estimated start time of a browning state of the food article based on a plurality of temporally spaced measurements indicative of the power drawn by the at least one heating component; and controlling the at least one heating component of the cooking device based on the estimated start time of the browning state.

14. The method according to claim 10, further comprising:

receiving a user input indicative of a target outcome shade of browning of the food article.

15. The method according to claim 13, further comprising:

receiving a user input indicative of a target outcome shade of browning of the food article; and controlling the at least one heating component of the cooking device based on a comparison of the target outcome shade of browning to the estimated outcome shade of browning.

16. The method according to claim 10, further comprising:

revising a cooking program based on based on at least one of a determined estimated cooking time and the estimated start time of a browning state; and controlling the at least one heating component according to the revised cooking program.

17. The method according to claim 14, wherein the at least one heating component is controlled to increase the temperature of the cooking chamber in response to the estimated outcome shade of browning being lighter than the target shade of browning of the food article.

18. The method according to claim 17, further comprising determining a revised estimated cooking completion time based on the temperature of the cooking chamber being increased, wherein the revised estimated cooking completion time is less than the initial estimated cooking completion time.

19. The method according to claim 14, wherein the at least one heating component is controlled to reduce the temperature of the cooking chamber in response to the estimated outcome shade of browning being darker than the target shade of browning of the food article.

20. The method according to claim 19, further comprising determining a revised estimated cooking completion time based on the temperature of the cooking chamber being reduced, wherein the revised estimated cooking completion time is greater than the initial estimated cooking completion time.

* * * * *